United States Patent
Ko et al.

(10) Patent No.: US 11,092,460 B2
(45) Date of Patent: Aug. 17, 2021

(54) SENSOR CONTROL SUPPORT APPARATUS, SENSOR CONTROL SUPPORT METHOD AND NON-TRANSITORY COMPUTER READABLE MEDIUM

(71) Applicant: KABUSHIKI KAISHA TOSHIBA, Tokyo (JP)

(72) Inventors: Myungsook Ko, Ota Tokyo (JP); Arika Fukushima, Ota Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 321 days.

(21) Appl. No.: 15/906,341

(22) Filed: Feb. 27, 2018

(65) Prior Publication Data

US 2019/0041235 A1 Feb. 7, 2019

(30) Foreign Application Priority Data

Aug. 4, 2017 (JP) .............................. JP2017-151911

(51) Int. Cl.
| | | |
|---|---|---|
| *G01D 5/00* | (2006.01) | |
| *G01D 21/00* | (2006.01) | |
| *G01D 9/00* | (2006.01) | |
| *H04Q 9/00* | (2006.01) | |

(52) U.S. Cl.
CPC ............... *G01D 5/00* (2013.01); *G01D 9/005* (2013.01); *G01D 21/00* (2013.01); *H04Q 9/00* (2013.01); *H04Q 2209/883* (2013.01)

(58) Field of Classification Search
CPC .......... G01D 9/005; G01D 5/00; G01D 21/00; H04Q 9/00; H04Q 2209/883
See application file for complete search history.

(56) References Cited

U.S. PATENT DOCUMENTS

| 7,650,144 | B2 | 1/2010 | Nakamura et al. | |
|---|---|---|---|---|
| 9,800,646 | B1* | 10/2017 | Stamatakis | H04L 67/025 |
| 2004/0030235 | A1* | 2/2004 | Sasaki | A61B 6/541 |
| | | | | 600/413 |
| 2004/0198386 | A1* | 10/2004 | Dupray | H04W 64/00 |
| | | | | 455/456.1 |
| 2013/0116991 | A1 | 5/2013 | Hido | |
| 2015/0112891 | A1 | 4/2015 | Watanabe et al. | |
| 2016/0084869 | A1* | 3/2016 | Yuen | G01P 7/00 |
| | | | | 73/510 |
| 2016/0261481 | A1 | 9/2016 | Ogata et al. | |

FOREIGN PATENT DOCUMENTS

| JP | 2006-279927 A | 10/2006 |
|---|---|---|
| JP | 2016-163242 A | 9/2016 |
| JP | 2016-200949 | 12/2016 |
| JP | 2017-33470 | 2/2017 |
| WO | WO 2011/036809 | 3/2011 |
| WO | WO 2013/069568 | 5/2013 |
| WO | WO 2013/187295 | 12/2013 |

* cited by examiner

Primary Examiner — Mischita L Henson
(74) Attorney, Agent, or Firm — Finnegan, Henderson, Farabow, Garrett & Dunner L.L.P.

(57) ABSTRACT

According to one embodiment, a sensor control support apparatus includes: a sensor selector configured to, based on measurement data of a plurality of sensors for at least one monitoring target and state data indicating an state of the at least one monitoring target, select a sensor to be used for state prediction of the monitoring target from among the plurality of sensors; and a sensor controller configured to control the plurality of sensors based on a selection result of the sensor selector.

6 Claims, 14 Drawing Sheets

| SENSOR ID | LEARNING DATA ID | LEARNING DATA |
|---|---|---|
| 1 | 1 | 0.4 |
| 1 | 2 | 0.6 |
| 1 | 3 | 0.5 |
| ... | ... | ... |
| 1 | k-1 | 0.4 |
| 1 | k | 0.5 |
| ... | ... | ... |
| n | 1 | 1.5 |
| n | 2 | 1.3 |
| ... | ... | ... |
| n | k-1 | 1.6 |
| n | k | 1.1 |

"n*k" LINES (rows with SENSOR ID = 1)

FIG.4

| SENSOR ID | LEARNING DATA ID | TIME 1 | TIME 2 | TIME 3 | ... | TIME T |
|---|---|---|---|---|---|---|
| 1 | 1 | 2.1 | 7.4 | 9.5 | ... | 6.9 |
| 1 | 2 | 3.6 | 2.9 | 2.4 | ... | 1.9 |
| 1 | 3 | 1.8 | 5.2 | 6.3 | ... | 8.6 |
| ... | ... | ... | ... | ... | ... | ... |
| n | k−1 | 4.2 | 1.3 | 2.1 | ... | 2.7 |
| n | k | 1.2 | 4.9 | 4.7 | ... | 6.3 |

FIG.5

| LEARNING DATA ID | CLASSIFICATION LABEL |
|---|---|
| 1 | 1 |
| 2 | 0 |
| 3 | 1 |
| ... | ... |
| k−1 | 1 |
| k | 0 |

"k" LINES

CLASSIFICATION LABEL
1: NORMAL
0: ANOMALOUS

FIG.6

| LEARNING DATA ID OF "$S_1$" | 1 | 2 | ... | k |
|---|---|---|---|---|
| 1 | 0 | $x_{1,2}$ | ... | $x_{1,k}$ |
| 2 | $x_{2,1}$ | 0 | ... | $x_{2,k}$ |
| ... | ... | ... | ... | ... |
| k | $x_{k,1}$ | $x_{k,2}$ | ... | 0 |

FIG.7

INTER-DATA FEATURE TABLE OF
1ST SENSOR

| SENSOR "$S_1$" | 1 | 2 | ... | k |
|---|---|---|---|---|
| 1 | 0 | | ... | |
| 2 | | 0 | ... | |
| ... | ... | ... | ... | ... |
| k | | | ... | 0 |

INTER-DATA FEATURE TABLE OF
2ND SENSOR

| SENSOR "$S_2$" | 1 | 2 | ... | k |
|---|---|---|---|---|
| 1 | 0 | | ... | |
| 2 | | 0 | ... | |
| ... | ... | ... | ... | ... |
| k | | | ... | 0 |

...

INTER-DATA FEATURE TABLE OF
n-TH SENSOR

| SENSOR "$S_n$" | 1 | 2 | ... | k |
|---|---|---|---|---|
| 1 | 0 | | ... | |
| 2 | | 0 | ... | |
| ... | ... | ... | ... | ... |
| k | | | ... | 0 |

EXPLANATORY VARIABLE TABLE

"n*k" LINES

| SENSOR ID, LEARNING DATA ID | 1,1 | 1,2 | ... | 1,k | 2,1 | 2,2 | ... | 2,k | ... | n,1 | N,2 | ... | N,k |
|---|---|---|---|---|---|---|---|---|---|---|---|---|---|
| 1 | 0 | | ... | | 0 | | ... | | ... | 0 | | ... | |
| 2 | | 0 | ... | | | 0 | ... | | ... | | 0 | ... | |
| ... | ... | ... | ... | ... | ... | ... | ... | ... | ... | ... | ... | ... | ... |
| k | | | ... | 0 | | | ... | 0 | ... | | | ... | 0 |

| SELECTED SENSOR ID | REPRESENTATIVE DATA ID |
|---|---|
| $S_2$ | 1,2,6,8,....,k-5 |
| $S_n$ | 1,2,4,9,11,...,k |

| SENSOR ID | SAMPLING FREQUENCY [Hz] | SENSOR UNIT PRICE [yen] | CONTINUOUS OPERATION TIME [min] | ... | POWER CONSUMPTION [kWh] |
|---|---|---|---|---|---|
| 1 | 100 | 2000 | 20 | ... | 5.0 |
| 2 | 1000 | 5000 | 100 | ... | 3.2 |
| 3 | 2000 | 10000 | 100 | ... | 2.9 |
| ... | ... | ... | ... | ... | ... |
| n-1 | 10 | 100 | 10 | ... | 7.2 |
| n | 500 | 3500 | 300 | ... | 8.0 |

FIG.15

SENSOR CONTROL SUPPORT APPARATUS, SENSOR CONTROL SUPPORT METHOD AND NON-TRANSITORY COMPUTER READABLE MEDIUM

CROSS REFERENCE TO RELATED APPLICATIONS

This application is based upon and claims the benefit of priority from the prior Japanese Patent Application No. 2017-151911, filed on Aug. 4, 2017, the entire contents of which are incorporated herein by reference.

FIELD

Embodiments described herein relate to a sensor control support apparatus, a sensor control support method and a non-transitory computer readable medium.

BACKGROUND

Recently IoT (Internet of Things) has been explosively spreading accompanying development of sensors and communication technology. Especially, many attempts are made to classify/utilize time-series measurement data obtained from a plurality of sensors according to classification purposes such as state monitoring/control of equipment and anomaly detection.

The time-series measurement data acquired as above is enormous, and, in such enormous data, information duplication may occur for a classification purpose. Further, it leads to excess of information to, when it is possible to make an intended classification only by data of a part of sensors, collect data of other sensors. Further, it leads to increase in power consumption to cause such sensors to operate. On the other hand, there is a possibility that sensors required for a classification purpose change accompanying a change in a monitoring target system or a change in a sensor configuration.

BRIEF DESCRIPTION OF THE DRAWINGS

FIG. 4 is a diagram showing an example of a sensor data table in which sensor data acquired from sensors 1 to "n" is stored;

FIG. 5 is a diagram showing another example of the sensor data table;

FIG. 6 is a diagram showing an example of a classification label table;

FIG. 7 is a diagram showing an example of an inter-data feature table for each sensor;

FIG. 8 is a diagram showing an example of a process for combining inter-data feature tables;

FIG. 15 is a diagram showing an example of a spec data table according to the third embodiment.

DETAILED DESCRIPTION

According to one embodiment, a sensor control support apparatus includes: a sensor selector configured to, based on measurement data of a plurality of sensors for at least one monitoring target and state data indicating an state of the at least one monitoring target, select a sensor to be used for state prediction of the monitoring target from among the plurality of sensors; and a sensor controller configured to control the plurality of sensors based on a selection result of the sensor selector.

Embodiments of the present invention will be described below with reference to drawings.

First Embodiment

Figure 1:
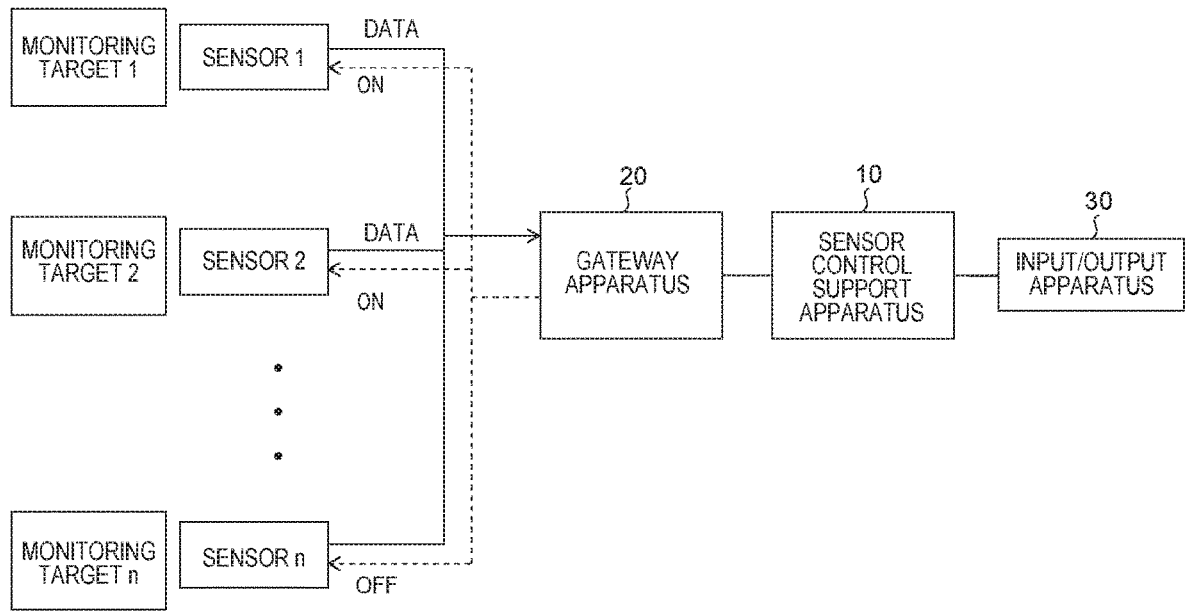
FIG. 1 is an overall configuration diagram of a system according to a first embodiment.
Figure 2:
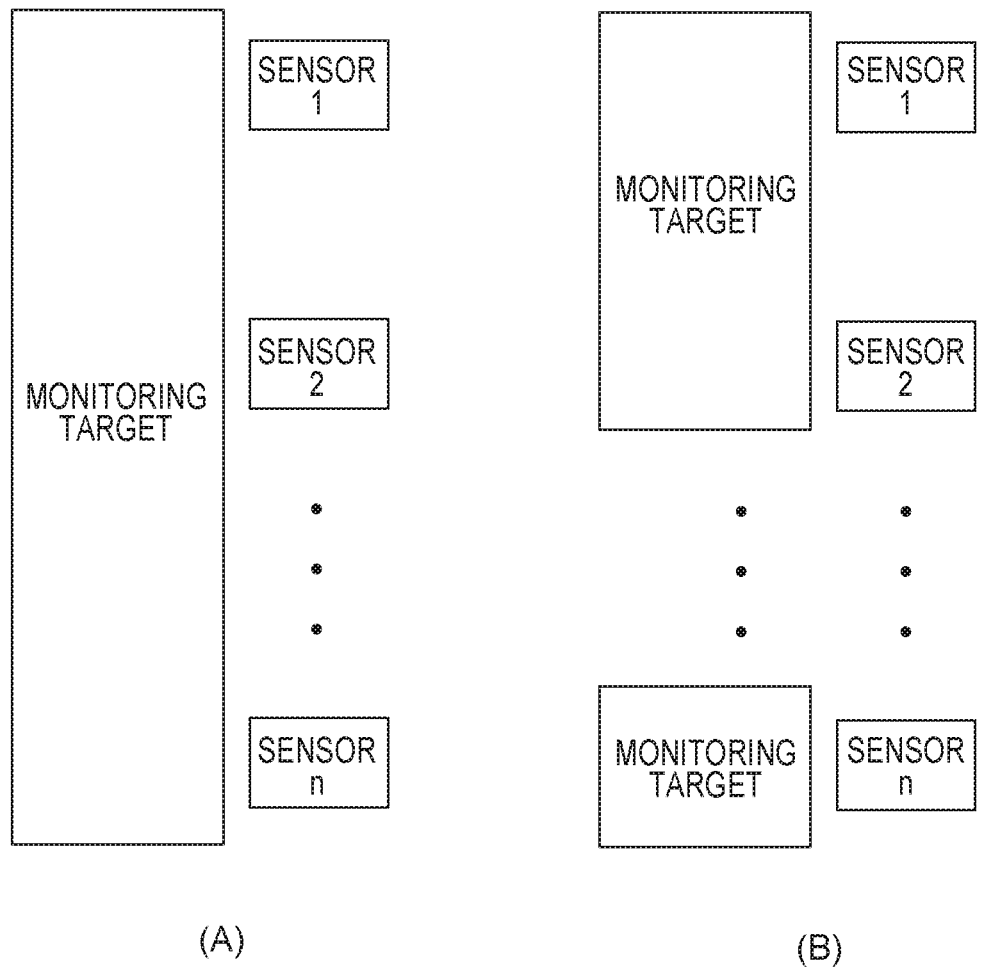
FIG. 2 is a diagram showing an example in which a plurality of sensors are attached to one monitoring target.

FIG. 1 shows an overall configuration diagram of a system according to the present embodiment. The present system is provided with a sensor control support apparatus 10, a gateway apparatus 20, an input/output apparatus 30 and a plurality of sensors 1 to "n". An outline of the present system will be described below with reference to FIGS. 1 and 2.

The sensors 1 to "n" are installed for a plurality of monitoring targets 1 to "n" ("n" is at least two or more), respectively. Here, one sensor is installed for an individual monitoring target. However, the plurality of sensors 1 to "n" may be installed for one monitoring target as in FIG. 2(A), or the number of installed sensors may be different for each monitoring target as in FIG. 2(B).

Each sensor is adapted to detect and transmit measurement data (sensor data) when the first to k-th conditions are satisfied as an initial state. As an example, the first to k-th conditions specify arrival of timings at the first to k-th points of time at predetermined time intervals (every ten minutes, one hour or the like). The first point of time, the second point of time, . . . the k-th point of time may be 0 o'clock, 1 o'clock, . . . 23 o'clock, respectively. In this case, each sensor detects and transmits sensor data every hour. Though it is assumed here that the sensors 1 to "n" detect and transmit sensor data at the same timings, the timings are not limited thereto.

The gateway apparatus 20 receives the sensor data detected by the sensors 1 to "n" via wired or wireless communication. The gateway apparatus 20 transmits the received sensor data to the sensor control support apparatus 10. The gateway apparatus 20 may immediately transmit the received sensor data to the sensor control support apparatus 10 or may temporarily accumulate the received sensor data and transmit the accumulated sensor data at predetermined time intervals.

Further, the gateway apparatus 20 is configured to be capable of controlling the sensors 1 to "n" by a control signal. For example, the gateway apparatus 20 can perform on/off control of the sensors 1 to "n". Further, the gateway apparatus 20 may control switching between a normal operation mode and a low power consumption mode. As an example of the low power consumption mode, the frequency of receiving sensor data from the sensors (the interval of receiving sensor data or the like) may be reduced.

The sensor control support apparatus 10 receives sensor data of the sensors 1 to "n" from the gateway apparatus 20. Thereby, the sensor control support apparatus 10 receives sensor data of each sensor chronologically. A string of the sensor data received chronologically will be called time-series data.

Further, the sensor control support apparatus 10 acquires state data indicating states of the monitoring targets at the time when sensor data is detected at the sensors 1 to "n" (that is, at the time when the first to k-th conditions is satisfied). The state data may be received from the gateway apparatus 20 or may be acquired from the input/output apparatus 30. Otherwise, the state data may be received from a server or a storage not shown. The input/output apparatus 30 is a terminal operated by a user (a designer, a local worker, a maintenance person or the like). The input/output apparatus 30 displays inputted data or information. Further, the input/output apparatus 30 accepts an input from the user and outputs a signal indicating an instruction or data which has been inputted to the sensor control support apparatus 10.

The state data may be created by the user (the designer, the local worker, the maintenance person or the like) by actually confirming the state of a monitoring target, or the present apparatus or another apparatus such as a server may create the state data from log data of the monitoring target. As an example, the state data includes a classification label indicating the state of the monitoring target. Specifically, if the state of the monitoring target is normal, a label indicating a normal class is included. If the state is anomalous, a label indicating an anomalous class is included. When one sensor is installed for each of "n" monitoring targets as in the example of FIG. 1, the label is the anomalous class label if one of the "n" monitoring targets is anomalous, and the label is the normal class label if all the monitoring targets are normal, as an example. Hereinafter, the state data will be called classification label data.

The sensor control support apparatus 10 is provided with a learning mode and an anomaly detection mode. In the learning mode, the sensor control support apparatus 10 generates a classification model for predicting a state of a monitoring target using the sensor data of the sensors 1 to "n" and the state data. The state of a monitoring target refers to whether the monitoring target is anomalous or not, as an example. In this case, the classification purpose is anomaly detection. As for sensor data used in the learning mode, the user may give the sensor data using the input/output apparatus 30.

As an example, the classification model is a function of calculating an objective variable corresponding to a predicted state of a monitoring target from at least one explanatory variable corresponding to at least one sensor and at least one coefficient corresponding to the at least one explanatory variable. The explanatory variable is given a feature calculated from sensor data of the corresponding sensor (as an example, an inter-data feature value to be described later).

The sensor control support apparatus 10 selects sensors corresponding to explanatory variables included in a generated classification model, among the sensors 1 to "n", as sensors to be used to predict states of monitoring targets. The sensors which have been selected will be called selected sensors. The other sensors, that is, sensors which are not used for state prediction will be called unselected sensors.

The sensor control support apparatus 10 transmit a signal indicating sensor IDs of the selected sensors to the gateway apparatus 20 as information about the selected sensors. Further, the sensor control support apparatus 10 transmit a signal indicating sensor IDs of the unselected sensors to the gateway apparatus 20 as information about the unselected sensors. Communication with the gateway apparatus 20 can be wireless communication or wired communication. The sensor ID is a sensor number as an example but is not limited thereto. Information other than the sensor IDs of the selected sensors may be included in the information about the selected sensors. For example, a sensing condition for the sensors may be included as described later.

The gateway apparatus 20 controls the sensors 1 to "n" based on the information about the selected sensors (or the information about the unselected sensors). Specifically, the gateway apparatus 20 controls the sensors 1 to "n" so as to maintain operation of the selected sensors and stop operation of the unselected sensors. That is, the gateway apparatus 20 causes the selected sensors to be turned on and causes power sources of the unselected sensors to be turned off. It is also possible to cause main circuits of the unselected sensors to be turned off while power sources of communication circuits such as reception circuits for communicating with the gateway apparatus 20 are not turned off.

In the anomaly detection mode, the sensor control support apparatus 10 predicts states of the monitoring targets based on the classification model and sensor data of the selected sensors received from the gateway apparatus 20. If an anomaly is detected, anomaly detection data showing that the anomaly has been detected may be generated and outputted to the input/output apparatus 30. The classification model may be mounted on an anomaly detection apparatus different from the sensor control support apparatus 10 so that operation of the anomaly detection mode may be executed in the anomaly detection apparatus.

Though the input/output apparatus 30 and the gateway apparatus 20 are separate apparatuses in FIG. 1, these may be configured as the same apparatus.

By causing only the selected sensors used for anomaly detection to be on and causing the unselected sensors to be off, among the plurality of sensors 1 to "n" for the monitoring targets as described above, power consumption can be reduced. The sensor control support apparatus will be described below in more detail.

Figure 3:
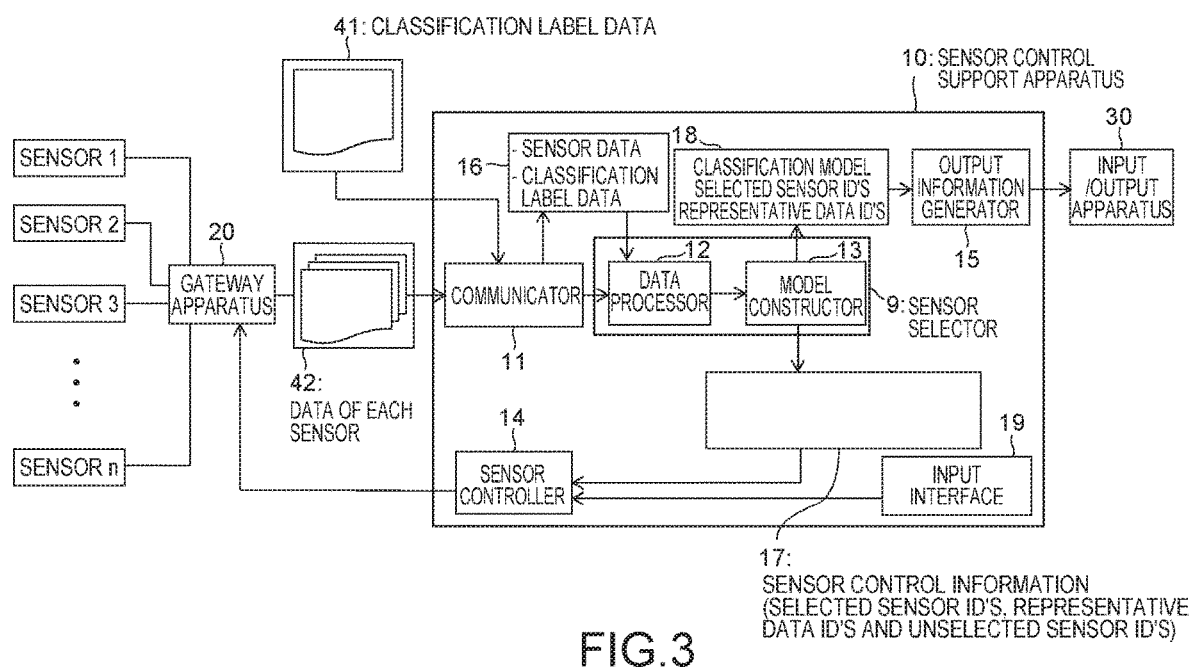
FIG. 3 is a block diagram showing a detailed configuration of a sensor control support apparatus.

FIG. 3 is a block diagram showing a configuration of the sensor control support apparatus 10.

The sensor control support apparatus 10 is provided with a sensor selector 9, a communicator 11, a sensor controller 14, an output information generator 15, a storage 16, a storage 17, a storage 18 and an input interface 19. The sensor selector 9 is provided with a data processor 12 and a model constructor 13. A part or all of these elements may be implemented by one or more circuits such as a CPU or a dedicated circuit. For example, the sensor selector 9 may be implemented by a sensor selecting circuit, the sensor controller 14 may be implemented by a sensor controlling circuit, and the communicator 11 may be implemented by a communication circuit. In this case, the sensor selecting circuit, the sensor controlling circuit and the communication circuitry may be physically same circuit or different circuits.

The communicator 11 is connected to the gateway apparatus 20 via a wired or wireless network. The communicator 11 receives measurement data (sensor data) detected by operating sensors from the gateway apparatus 20. It is assumed that, in the first learning mode, the sensors 1 to "n" are operating, and sensor data from the sensors 1 to "n" is received. The communicator 11 stores the received sensor data into a sensor data table of the storage 16. Sensor data used in the learning mode may be inputted from the input/output apparatus 30 and stored into the sensor data table by the user. Each sensor detects and transmits sensor data when the first to k-th conditions is satisfied, as an initial state. In the present example, it is assumed that the first to k-th conditions are arrivals of timings at which the first to k-th points of time at predetermined time intervals arrive. Another example of the first to k-th conditions, occurrence of a particular event (for example, detection of a value equal to or larger than a predetermined value, detection of a signal with a particular pattern or the like) is also possible.

Here, "sensor" is a generic name of equipment which observes a certain physical quantity and converts the physical quantity to a digital signal. There are various sensors such as an acceleration sensor, a magnetic sensor, an image sensor, a humidity sensor, a temperature sensor, a piezoelectric element, a mass sensor and a light sensor. Power generation devices such as a thermoelectric power generation element and a solar battery are also sensors. In this case, it can be thought that an amount of power generation corresponds to a sensor value.

In the present embodiment, the monitoring targets may be equipment such as air-conditioning equipment, equipment such as an MFP (Multifunction Peripheral), or other objects or products. Further, the monitoring targets may be living bodies such as humans, animals and plants. Furthermore, though anomaly detection of detecting whether a state is normal or anomalous is dealt with as a classification purpose in the present embodiment, other classification purposes are also possible.

FIG. 4 shows an example of a sensor data table in which sensor data collected from the sensors 1 to "n" is stored. For a sensor with the i-th sensor ID (a sensor "i"), "k" sensor data values are held as learning data. Though the values of the learning data may be sensor data values themselves, they may be values obtained by performing statistical processing of the sensor data values or may be values calculated based on the sensor data values. In this case, such a mathematical operation may be performed by the communicator 11 or another processor or may be performed on the input/output apparatus 30 side. The learning data values may be called features.

In the table of FIG. 4, "n*k" elements "$s_{i,j}$" ("i" and "j" refer to an ID of a sensor and an ID of learning data, respectively) are held. For example, an element "$s_{1,1}$" represents a value (=0.4) of learning data for "sensor ID=1" and "learning data ID=1".

A learning data ID is associated with each piece of learning data. The learning data ID identifies a point of time when the corresponding piece of learning data was detected (that is, a condition under which the learning data was detected). For example, a learning data ID of 1 of each of the sensors 1 to "n" corresponds to a first point of time (that is, the first condition).

FIG. 5 shows another example of the sensor data table. In this example, learning data is a vector (waveform data) holding a plurality of time-series values. This table holds "n*k*T" elements "$s_{i,j,t}$". Time "t" takes a value equal to or larger than 1 and equal to or smaller than "T", and "T" is a positive real number equal to or larger than 2. For example, "$s_{1,1,1}$" represents a sensor feature (=2.1) in the case of "sensor ID=1", "learning data ID=1" and "time t=1". Further, "$s_{1,1}$" represents "learning data (t=1, t=2, t=T)=(2.1, 7.4, 9.5, . . . , 6.9)" of "sensor ID=1" and "learning data ID=1".

If sensor data which could not be acquired or time at which sensor data could not be acquired exists in the sensor data table examples in FIGS. 4 and 5, an invalid value (such as "NA") can be stored.

The communicator 11 receives classification label data (state data) from an external apparatus specified in advance. The external apparatus may be the gateway apparatus 20 or may be a server different from the gateway apparatus 20. The communicator 11 stores the classification label data into a classification label table of the storage 16. The user may input the classification label data using the input/output apparatus 30.

FIG. 6 shows an example of the classification label table. The classification label table includes learning data IDs and classification labels. As the classification label, there are a label of "1" indicating a normal class and a label of "0" indicating an anomalous class. A learning data ID is given to each label. If the classification label is unknown, an invalid value (such as "NA") can be stored in a corresponding cell.

The data processor 12 of the sensor selector 9 performs preprocessing for generating a classification model by the model constructor 13. The data processor 12 reads out pieces of learning data 1 to "k" of each sensor from the sensor data table. The data processor 12 generates, for each sensor, a plurality of data sets by combining arbitrary two pieces among the pieces of learning data 1 to "k" and calculates a feature (hereinafter referred to as an inter-data feature) for each data set. Then, the generated inter-data features are stored into corresponding cells of a matrix having "k" lines and "k" columns. Thereby, an inter-data feature table is generated. The inter-data feature table is generated for each sensor.

For example, an inter-data feature "$x_{j,r}$" between the j-th learning data "$S_{i,j}$" of the sensor "i" and the r-th learning data "$S_{i,r}$" of the sensor "i" is calculated by the following formula.

[Formula 1]

$$x_{j,r}=Dis(S_{i,j},S_{i,r}) \qquad (1)$$

A Dis function in the formula (1) is a function for calculating a distance between two pieces of learning data. Functions for performing addition, subtraction, multiplication or division between two pieces of learning data are conceivable. If learning data is time-series data, a function for calculating a coefficient of correlation indicating a degree of similarity between two pieces of time-series data, Dynamic Time Warping which is a distance function between pieces of time-series data in consideration of non-linear distortion, Shaplet which is a distance function capable of considering partial time-series or the like are conceivable.

When "j" and "r" are equal (that is, in the case of a self-mutual inter-data feature), the inter-data feature "$x_{j,r}$" is set to 0. Further, when a value of at least one piece of learning data of a data pair is an invalid value ("NA") or when the value of the learning data is an unreliable value also, the inter-data feature is set to 0.

Figure 7:
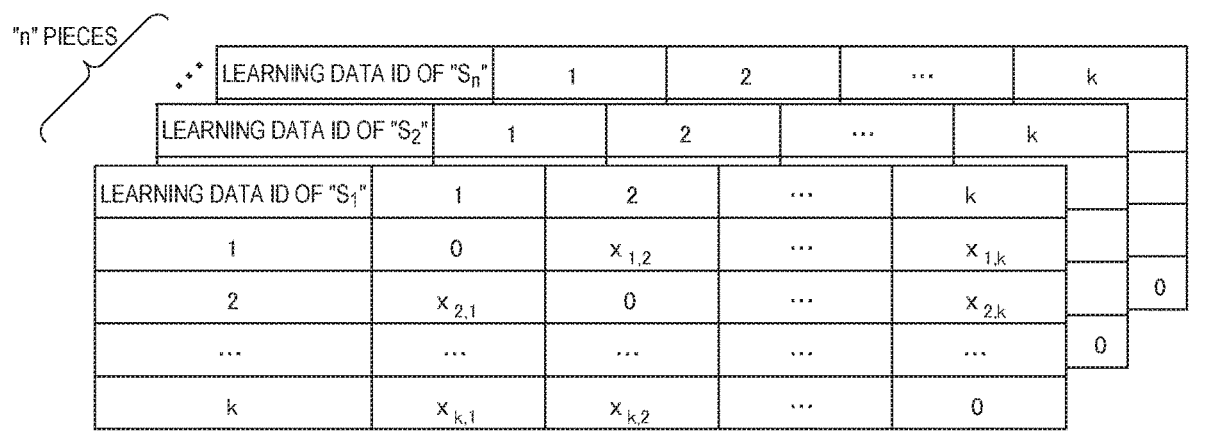

FIG. 7 shows an example of the inter-data feature table for each sensor. In FIG. 7, "$S_1$" to "$S_n$" indicate the sensors 1 to "n". The inter-data feature is indicated by "$x_{j,r}$ (j=1, . . . , k; r=1, . . . , k)". For example, "$x_{1,2}$" represents an inter-data feature between the learning data 1 (learning data of "learning data ID=1") and the learning data 2 (learning data of "learning data ID=2"). Examples of the inter-data feature include a degree of similarity or a difference between the two pieces of learning data. For example, when the inter-data feature is a difference, "$x_{1,2}$" is a value obtained by subtracting a value of the learning data 2 from a value of the learning data 1, and "$x_{2,1}$" is a value obtained by subtracting the value of the learning data 1 from the value of the learning data 2.

The data processor 12 acquires the classification label data from the storage 16. The data processor 12 performs a binarization process as preprocessing if classification labels are not binarized. For example, each classification label is converted to 1 or 0 by converting a value equal to or above a threshold to 1, and a value below the threshold to 0.

The data processor 12 performs a process for combining the inter-data feature tables of the sensors 1 to "n". Specifically, by combining the inter-data feature tables of all the sensors in a line direction, an explanatory variable table is generated. When the combination process is performed for the inter-data feature tables shown in FIG. 7, an explanatory variable table with "n*k" columns and "k" lines is generated. For each column of the explanatory variable table, normalization may be performed so that an average of 0 and a distribution of 1 are obtained in a column direction. Otherwise, for each line, normalization may be performed so that an average of 0 and a distribution of 1 are obtained in the line direction.

FIG. 8 shows an example of a process for combining inter-data feature tables. By integrating the inter-data feature tables of the sensors at an upper part of FIG. 8 in a line direction, an explanatory variable table at a lower part of FIG. 8 is generated.

In the explanatory variable table, in a column of "(sensor ID, learning data ID)=(1, 1)", an inter-data feature (=0) between the learning data 1 and the learning data 1, an inter-data feature between the learning data 2 and the learning data 1, an inter-data feature between the learning data 3 and the learning data 1, . . . , and an inter-data feature between the learning data "k" and the learning data 1 are stored for the sensor 1. In a column of "(sensor ID, learning data ID)=(2, k)", an inter-data feature between the learning data 1 and the learning data 2, an inter-data feature (=0) between the learning data 2 and the learning data 2, an inter-data feature between the learning data 3 and the learning data 2, . . . , and an inter-data feature between the learning data "k" and the learning data 2 are stored for the sensor 2. An inter-data feature between learning data "j" and learning data "r" for the sensor "n" may be represented by "$x_{n,j,r}$".

The method for creating the explanatory variable table is not limited to the above example. As an example of the another method for creating, the pieces of learning data of each column to be combined with the pieces of learning data of each line may be limited to learning data having a predetermined label (for example, the normality class label) for each sensor. Thereby, the size of the explanatory variable table can be kept small. If an invalid value (such as "NA") is included as a classification label, an inter-data feature calculated using learning data corresponding to the classification label which is given the invalid value, may be deleted from the inter-data feature table or the explanatory variable table.

The data processor 12 provides the classification label data and the explanatory variable table to the model constructor 13 of the sensor selector 9.

The model constructor 13 constructs a classification model based on the explanatory variable table and classification label data received from the data processor 12.

Hereinafter, an example will be shown in which the model constructor 13 generates a logistic regression model as a classification model. Models other than the logistic regression model, for example, an SVM can be generated as a classification model.

The logistic regression model is a regression model in accordance with the following formula:

[Formula 2]

$$P(y=1 \mid X) = logit(z) = \frac{1}{1+e^z} \quad (2)$$

$$z = \sum_{i=1}^{n} \sum_{j=1}^{k} \sum_{r=1}^{k} \beta_{i,j,r} x_{i,j,r} + \beta_0$$

Here, "logit" represents a logistic function; "logit(z)" has a value range larger than 0 and smaller than 1; and "$\beta_0$" represents an intercept.

Here, "$x_{i,j,r}$" is an explanatory variable corresponding to the i-th sensor. More specifically, "$x_{i,j,r}$" represents an inter-data feature between the j-th learning data and the r-th learning data for the i-th sensor (corresponding to an inter-data feature of a cell at which the j-th line and the r-th column cross each other in the inter-data feature table of the i-th sensor).

Here, "$\beta_{i,j,r}$" is a coefficient (regression coefficient) for the inter-data feature "$x_{i,j,r}$". Here, regression coefficients for one sensor "i" will be collectively written as "$\beta_i = \{\beta_{i,1,1}, \beta_{i,1,2}, \ldots, \beta_{i,k,k}\}$". Further, "$\beta_i$" for all the sensors will be collectively written as "$\beta = \{\beta_1, \beta_2, \ldots, \beta_n\}$".

Here, "z" is a value obtained by integrating the regression coefficient "$\beta_{i,j,r}$" and the inter-data feature "$x_{i,j,r}$". For example, "z" is a value obtained by performing weighted addition of a plurality of inter-data features "$x_{i,j,r}$", in any one line in the explanatory variable table, with a plurality of regression coefficients "$\beta_{i,j,r}$". As a modification, a formula which does not include "$\beta_0$" may be used as a formula for "z".

Here, "X" is a vector which includes inter-data features "$x_{i,j,r}$" (i=1 to n, r=1 to k) about the j-th learning data of the "n" sensors. The number of elements of the vector is "n*k". That is, "X" corresponds to any one line of the explanatory variable table. Further, "P(y=1|X)" (that is, the value of "logit(z)") represents a probability of a classification label (here, the normality class label) being 1 when the vector X is given. Here, "P(y=1|X)" has a value larger than 0 and smaller than 1.

In the case of deciding a classification label to be given to a monitoring target using the classification model described above, a method of using a threshold can be adopted as an example. As shown in the example below, if the value of the function "logit(z)" (the probability of being 1) is above a threshold "C", 1 is given as a classification label, and 0 is given as a classification label if the value is equal to or below the threshold "C". The threshold "C" may be inputted from the input/output apparatus 30 by the user.

classification label: 1 logit(z)>C classification label: 0 logit(z)<=C      [Formula 3]

It is necessary to determine "$\beta = \{\beta_1, \beta_2, \ldots, \beta_n\} = \{\beta_{1,1,1}, \beta_{1,1,2}, \ldots, \beta_{1,k,k}, \beta_{2,1,1}, \beta_{2,1,2}, \ldots, \beta_{2,k,k}, \ldots, \beta_{n,1,1}, \beta_{n,1,2}, \ldots, \beta_{n,k,k}\}$", which is a regression coefficient in Formula (2) and "$\beta_0$". If all of "$\beta_{1,j,r}$" are 0 for "j=1 to k" and "r=1 to k", it means that the sensor "i" is not used (does not have to be selected). Further, if all of "$\beta_{i,s,r}$" are 0 for "r=1 to k" in the case of "j=s", and all of "$\beta_{i,j,s}$" are 0 for "j=1 to k" in the case of "r=s", it means that learning data "s" is unnecessary. That is, it means that, it is not necessary to select the condition corresponding to the ID of the learning data "s".

Here, "$\beta=\{\beta_1, \beta_2, \ldots, \beta_n\}$" and "$\beta_0$" can be determined, for example, using a maximum likelihood estimation method or a least squares method. In this case, in order to prevent over-learning, an estimation method which includes regularization and which is capable of simultaneously performing selection of variables and construction of a classification model is used. Specifically, "Lasso" or "Elastic Net" is used. Since "Lasso" is a kind of "Elastic Net", an example of using "Elastic Net" will be shown here.

In "Elastic Net", at the time of determining "$\beta$" and "$\beta_0$" by the least squares method, Formula (3) of a minimization problem of a loss function "J" is solved using a penalty term "$\lambda E(\beta)$". Formula (3) is a concave function. The penalty term is shown by Formula (4). The loss function "J" is a sum of square errors between a true value "$y_j$" of an objective variable and an estimated value (a value of logit) "$\hat{y}_j$" calculated by a logistic regression function having "$\beta$" and "$\beta_0$" as shown by Formula (5). Formula (5) represents a quantification value of a difference between a value of a classification label (the true value "$y_j$") and an output value of a classification model (the value of "logit"). Formula (3) is an example of a function of minimizing a value based on Formula (5).

[Formula 4]

$$\mathrm{argmin}(J+\lambda E(\beta)) \qquad (3)$$

$$\lambda E(\beta)=\lambda((1-\alpha)\Sigma_{i=1}{}^n\Sigma_{j=1}{}^k\Sigma_{r=1}{}^k\|\beta_{i,j,r}\|^2 + \alpha\Sigma_{i=1}{}^n\Sigma_{j=1}{}^k\Sigma_{r=1}{}^k\|\beta_{i,j,r}\|) \qquad (4)$$

$$J=\Sigma_{j=1}{}^k\|y_j-\hat{y}_j\|^2 \qquad (5)$$

Here, "$\lambda$" is a parameter to decide strength of a penalty term, and "$\lambda$" can be decided in arbitrary method. As an example, a cross validation method can be used. For example, the explanatory variable table is divided along the line direction (a horizontal direction along the page) to generate a plurality of partial tables, and an optimal "$\lambda$" is decided from the plurality of partial tables by the cross validation method. The number of divisions is generally about 10 to 100. For example, on the assumption of "k=200", ten partial tables of "k=1 to 20, 21 to 40, ..., 191 to 200" are obtained by division into ten. By constructing a classification model using the second to tenth partial tables as training cases and performing evaluation (such as accuracy evaluation) of the classification model using the first partial table as a test case, "$\lambda$" satisfying a predetermined criterion (for example, such "$\lambda$" that an identification rate is the highest). This is repeated until each partial table has been used as a test case once. An optimal "$\lambda$" is decided from among the decided "$\lambda$"s. For example, "$\lambda$" with the highest identification rate is adopted. The specific example of the cross validation method is a mere example, and there are other various specific examples.

Here, "$\alpha$" is a parameter that adjusts strengths of the first and second terms of Formula (4). In "Elastic Net", the range is "$0<\alpha<1$". In the case of "Lasso", "$\alpha=1$" is assumed. Though the value of the parameter is arbitrary, for example, "$\alpha=0.5$" is assumed.

As for regularization including "Elastic Net" or "Lasso", see Regularization and variable selection via the elastic net [Zou, Hui; Hastie, Trevor 2005].

Among the elements of the regression coefficient "$\beta$" determined in this way ($\beta_{i,j,r}$: i=1 to n, j=1 to k, r=1 to k), nonzero elements and zero elements exist.

If at least one element is nonzero in "$\beta_i=(\beta_{i,1,1}, \beta_{i,1,2}, \ldots, \beta_{i,k,k})$", the model constructor 13 selects the sensor "i". On the other hand, if all of "$\beta_{i,1,1}, \beta_{i,1,2}, \ldots, \beta_{i,k,k}$" are zero, the model constructor 13 does not select the sensor "i".

Further, for "$\beta_{i,j,r}$" which are nonzero, each of the learning data "j" and the learning data "r" for the sensor "i" is selected as representative data. On the other hand, if all of "$\beta_{i,s,r}$" are zero for "r=1 to k" in the case of "j=s", and all of $\beta_{i,j,s}$" are zero for "j=1 to k" in the case of "r=s", the learning data "s" is not selected for the sensor "i".

Though whether selection of sensors and learning data is possible or not is judged on the basis of whether nonzero or not here, whether the selection is possible or not may be judged on the basis of whether being larger than a threshold or not as a modification.

Figure 9:
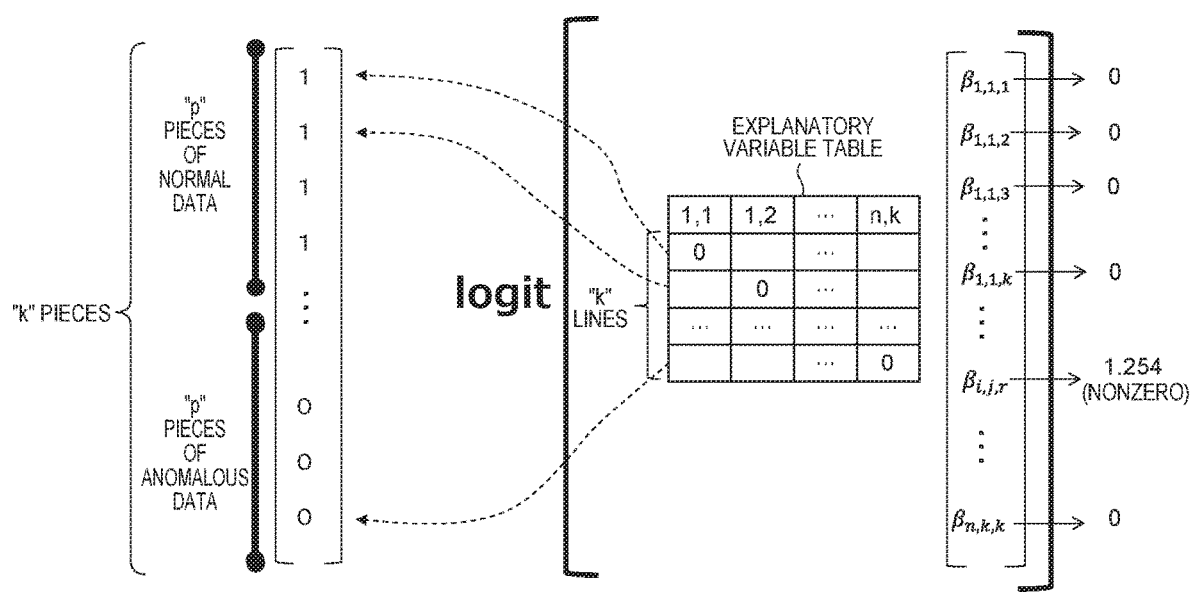
FIG. 9 is a diagram showing an operation image of a classification model construction process.

FIG. 9 shows an operation image of the classification model construction process. On the left side of FIG. 9, classification labels corresponding to "learning data IDs=1 to k" are shown. In this example, in the case of "k=1 to p", the monitoring target is normal (the classification labels each is 1). In the case of "k=p+1 to q", the monitoring target is anomalous (the classification labels each is 0). Regarding the values of the classification labels as true values, classification model construction (estimate of the regression coefficient) is performed.

In the parentheses of "logit" in FIG. 9, an explanatory variable table and "vector $\beta=(\beta_{1,1,1}, \beta_{1,1,2}, \beta_{1,1,3}, \ldots, \beta_{i,j,r}, \ldots, \beta_{n,k,k})^T$" are shown. This schematically expresses that a vector that stores values of each line of the explanatory variable table, "$\{x_{1,1,1}, x_{1,1,2}, x_{1,1,3}, \ldots, x_{i,j,r}, \ldots, x_{n,k,k}\}$" is multiplied by the "vector $\beta=\{\beta_{1,1,1}, \beta_{1,1,2}, \beta_{1,1,3}, \ldots, \beta_{i,j,r}, \ldots, \beta_{n,k,k}\}$". That is, this expresses the formula for "z" of Formula (2).

As shown by a broken line arrow from the first line of the explanatory variable table (an uppermost broken line), when the learning data 1 of each sensor is acquired, the monitoring target is normal, that is, the classification label is 1. Similarly, as shown by a broken line arrow from the k-th line of the explanatory variable table (a lowermost broken line), when the learning data "k" of each sensor is acquired, the monitoring target is anomalous, that is, the classification label is 0.

Since each element of "$\beta_1$" becomes zero, that is, all of "$\beta_{1,1,1}, \beta_{1,1,2}, \beta_{1,1,3}, \ldots, \beta_{1,1,k}$" become zero, the sensor 1 is not selected.

Here, since "$\beta_{i,j,r}$" is nonzero, the sensor "i" is selected. At least the learning data "j" and the learning data "r", among the pieces of learning data 1 to "k" of the sensor "i", are selected as representative data.

Though "$\beta_{n,k,k}$" is zero, the sensor "n" is selected if at least one element other than "$\beta_{n,k,k}$", among elements of "$\beta_n$", that is, "$\{\beta_{n,1,1}, \beta_{n,1,2}, \beta_{n,1,3}, \ldots, \beta_{n,k,k}\}$" is nonzero. Learning data paired with learning data corresponding to the nonzero element is also selected as representative data.

The model constructor 13 stores a classification model, sensor IDs of selected sensors (selected sensor IDs), and learning data IDs of representative data (representative data IDs) about the selected sensors into the storage 18. Unselected sensor IDs may be added to the storage 18. The classification model includes regression coefficients which are nonzero and does not include regression coefficients which are zero. Further, the classification model includes information about the definition of the function shown in Formula (2). These pieces of information stored into the storage 18 will be referred to as model-related information.

Further, the model constructor 13 stores the selected sensor IDs, the representative data IDs and the unselected sensor IDs into the storage 17. These pieces of information stored into the storage 17 will be referred to as sensor control information.

Figures 10, 11:
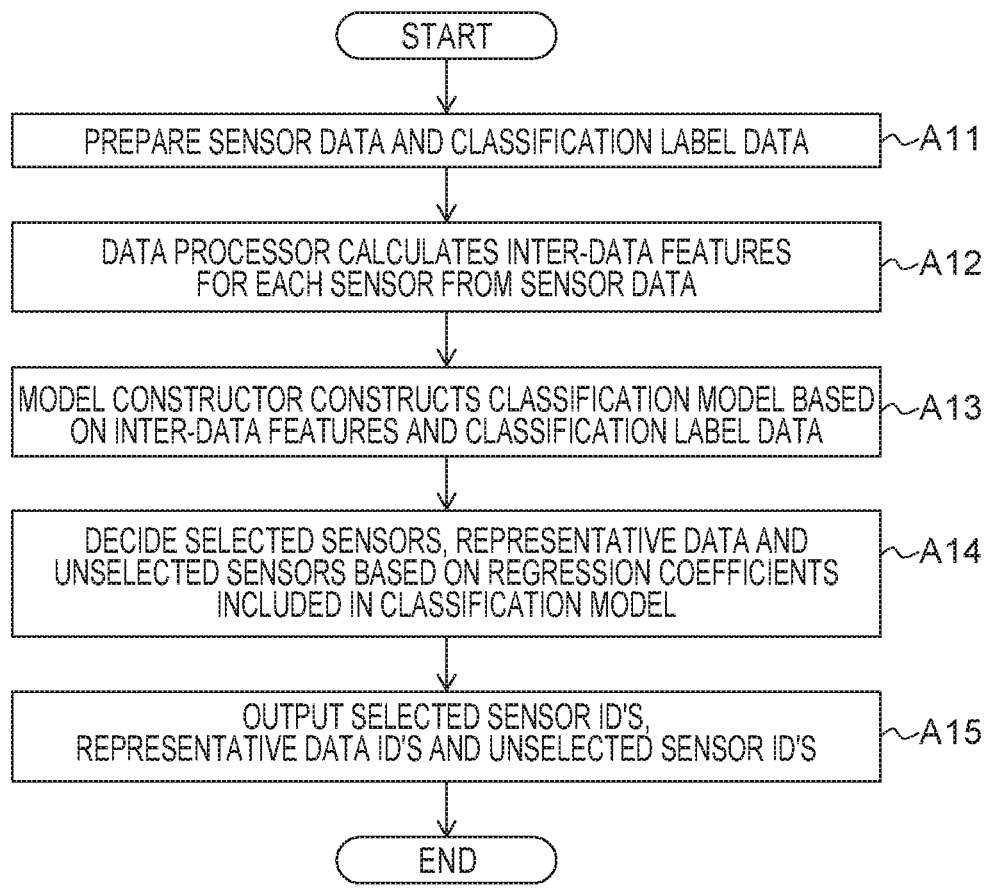
FIG. 10 is a diagram showing an example of output information.
FIG. 11 is a flowchart of operation of the sensor control support apparatus according to the first embodiment.

The output information generator 15 generates output information to be presented to the user based on the model-related information stored into the storage 18. The output information generator 15 provides the generated output information to the input/output apparatus 30. The input/output apparatus 30 displays the output information received from the output information generator 15 on a screen. FIG. 10 shows an example of the output information. As an example, the output information includes selected sensor IDs and representative data IDs. In addition to these pieces of information, the output information may include unselected sensor IDs. Further, data indicating a classification model (including definition of a function and regression coefficient values). Further, the output information may include other related information such as information indicating the number of pieces of representative data for each sensor.

Instead of Formula (4) of the penalty term described above, Formula (6) below may be used.

[Formula 5]

$$\lambda E(\beta) = \lambda \left( (1-\alpha) \sum_{i=1}^{n} \sum_{j=1}^{k} \sum_{r=1}^{k} \|\beta_{i,j,r}\|^2 + \alpha \sum_{i=1}^{n} \sum_{j=1}^{k} \sum_{r=1}^{k} \frac{1}{\|N_i\|} \|\beta_{i,j,r}\| \right) \quad (6)$$

Formula (6) is obtained by adding "$1/\|Ni\|$" on the right side of Formula (4). Here, "Ni" corresponds to the sensor "i"; the range of "i" is from 1 to "n"; and "$1/\|Ni\|$" is a constant. A value of "Ni" is given to advance for each sensor. It is assumed that "Ni" is a natural number larger than 0. The user sets the value of "Ni" larger for a sensor with a higher priority (that is, a sensor the designer wants to select more) among the sensors 1 to "n". Thereby, for the sensor the designer wants to select more, the value of a term that includes "$1/\|Ni\|$" is smaller, and the value of the penalty term is smaller. For example, the value of "Ni" is set larger for a sensor for which cost (installation cost and the like) to be described later is lower.

Though an explanatory variable table is generated by combining inter-data feature tables of sensors in the embodiment described above, this process may be omitted. In this case also, a classification model can be constructed by a process similar to the above process.

The sensor controller 14 controls the sensors 1 to "n" based on a result of selection of sensors by the sensor selector 9. More specifically, the sensor controller 14 controls the sensors 1 to "n" using the sensor control information stored into the storage 17. Control of the sensors 1 to "n" is performed via the gateway apparatus 20. However, when the sensor controller 14 is capable of directly communicating with the sensors 1 to "n", the sensor controller 14 can directly send control signals to the sensors 1 to "n" to control the sensors.

The sensor controller 14 transmits the sensor control information (the selected sensor IDs, the representative data IDs and the unselected sensor IDs) stored in the storage 17 to the gateway apparatus 20. The gateway apparatus 20 performs on/off control of the sensors 1 to "n" based on the selected sensor IDs and the unselected sensor IDs included in the sensor control information received from the sensor controller 14. For example, if the selected sensor IDs are "$S_2$" and "$S_n$", and the unselected sensor IDs are "$S_1$", and "$S_3$" to "$S_{n-1}$", the sensors 2 and "n" are kept being on, and the sensor 1 and the sensors 3 to "n-1" are turned off. Specifically, the gateway apparatus 20 generates a control signal giving an instruction to turn off power and transmits the generated control signal to the sensor 1 and the sensors 3 to "n-1". When receiving this control signal, the sensor 1 and the sensors 3 to "n-1" turn off power for circuits such as the main circuits. Thereby, power consumption is reduced. Instead of turning off power, the sensors may be switched to the low power consumption mode. As an example of the low power consumption mode, the frequency of collecting sensor data may be reduced. Otherwise, the CPU clock may be reduced, or other methods may be used.

Further, the gateway apparatus 20 transmits a control signal giving an instruction to detect sensor data under conditions corresponding to representative IDs, to sensors indicated by selected sensor IDs. Receiving the control signal, the sensors detect sensor data based on the conditions shown by the control signal and transmit the detected sensor data to the gateway apparatus 20. For example, in the example of FIG. 10, since representative data IDs about the sensor 2 are 1, 2, 6, 8, . . . , sensor data is detected when conditions corresponding to the representative data IDs are satisfied. If conditions corresponding to learning data IDs 3, 4, 5, 7 and the like are satisfied, sensor data is not detected. If the conditions specify timings, sensor data is detected at timings when the learning data ID corresponds to 1, 2, 6, 8, . . . , and sensor data is not detected at timings when the learning data ID corresponds to 3, 4, 5, 7 or the like. Otherwise, as for the case where the learning data ID is 3, 4, 5, 7 or the like, it is also possible not to transmit the sensor data, though detecting sensor data at the timings corresponding to 3, 4, 5, 7 or the like. In this case, transmission power can be reduced. Thus, by detecting or transmitting sensor data only when conditions corresponding to representative IDs are satisfied, power consumption can be reduced. It is also possible to perform only on/off control of sensors without performing control based on representative data IDs. In this case, sensor data which is unnecessary for anomaly detection is collected, but it has no problem in operation.

Though the sensor controller 14 autonomously notifies sensor control information to the gateway apparatus 20 in the present embodiment, the sensor controller 14 may notify the sensor control information based on an instruction from the user. In this case, the user identifies selected sensor IDs, representative data IDs and unselected sensor IDs based on output information displayed on a screen of the input/output apparatus 30 and inputs sensor control information using the input/output apparatus 30. The input interface 19 receives this instruction and notifies the inputted sensor control information to the sensor controller 14. The sensor controller 14 transmits the sensor control information to the gateway apparatus 20.

FIG. 11 is a flowchart of operation of the sensor control support apparatus according to the present embodiment. The communicator 11 receives sensor data and classification label data (state data) from the gateway apparatus 20 or the input/output apparatus 30 and stores the received sensor data and classification label data into the storage 16 (A11).

The data processor 12 reads out sensor data of each sensor from the storage 16 and calculates a plurality of inter-data features for each sensor (A12). More specifically, an inter-data feature table (see FIG. 7 or 8) having "k" lines and "k"

columns and storing an inter-data feature between the j-th learning data "$S_{i,j}$" and r-th learning data "$S_{i,r}$" of the sensor "i" in a corresponding cell. By combining the inter-data feature tables of all the sensors in a line direction, an explanatory variable table is created (see FIG. 8). Normalization may be performed for the explanatory variable table in a column direction (or in the line direction). For example, normalization is performed so that, for each column, average 0 and dispersion 1 are obtained for values of cells belonging to the column.

Further, the data processor 12 reads out the classification label data from the storage 16. If each classification label included in the classification label data is not binarized, the classification label is binarized. For example, each classification label is converted to 1 or 0 by converting a value equal to or above a threshold to 1, and a value below the threshold to 0.

The data processor 12 provides the classification label data and the explanatory variable table to the model constructor 13.

The model constructor 13 constructs a classification model using the classification label data and the explanatory variable table (A13). That is, a regression coefficient (an explanatory variable) β included in the classification model is calculated. As an example, the explanatory variable table is divided (for example, into ten) along the line direction. The classification label data is also divided (for example, into ten), and divided pieces of classification data are associated with divided explanatory variable tables. Then, the penalty term "λ" is decided using the cross validation method, and a vector "β" including a plurality of regression coefficients is calculated by solving a minimization problem of an error function with regularization.

The model constructor 13 selects nonzero regression coefficients from the vector "β", and causes sensors corresponding to the selected regression coefficients to be selected sensors and causes other sensors to be unselected sensors (A14). Further, leaning data (leaning data related to the selected sensors) required to calculate the nonzero regression coefficients are caused to be representative data (A14). Details of methods for deciding the selected sensors, the unselected sensors and the representative data are as described before.

The model constructor 13 stores the selected sensor IDs, the representative data IDs and the unselected sensor IDs into the storage 17 as sensor control information. Further, the model constructor 13 stores the classification model, the selected sensor IDs, the representative data IDs and like into the storage 18 as model-related information.

The sensor controller 14 reads out the sensor control information (the unselected sensor IDs, the selected sensor IDs and the representative data IDs) from the storage 17 and transmits the sensor control information to the gateway apparatus 20 (A15). Transmission of either the unselected sensor IDs or the selected sensor IDs may be omitted. Sensors indicated by sensor IDs other than the sensor IDs the transmission of which is omitted can be judged to be sensors indicated by the remaining IDs on the gateway apparatus 20 side.

The gateway apparatus 20 transmits a control signal to the unselected sensors to turn off power or switch to the low power consumption mode. Receiving the control signal, the sensors, for example, turn off power or switch to the low power consumption mode. Even if power is turned off, power may be supplied to communication circuits such as reception circuits so that an instruction signal to turn on power can be received from the gateway apparatus 20.

Further, the gateway apparatus 20 transmits a control signal giving an instruction to detect sensor data under conditions corresponding to the representative data IDs, to the selected sensors. Receiving the control signal, the sensors detect sensor data only when the conditions specified by the control signal are satisfied, and transmit the detected sensor data to the present apparatus 10.

As described above, according to the present embodiment, it becomes possible to, by causing only such sensors that are required to perform monitoring according to a classification purpose, reduce the trouble of manually making settings for operation of sensors and reduce power consumption and communication cost.

Second Embodiment

Figure 12:
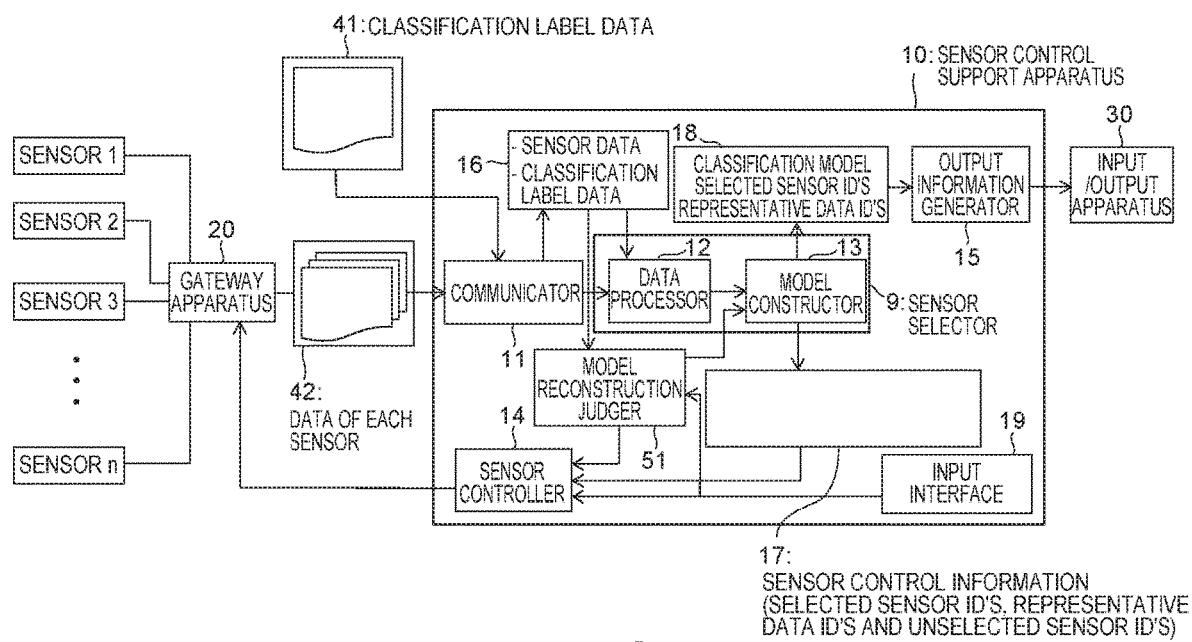
FIG. 12 is a block diagram showing a sensor control support apparatus according to a second embodiment.

FIG. 12 is a block diagram showing a sensor control support apparatus 10 according to a second embodiment. A model reconstruction judger 51 is added to the sensor control support apparatus according to the first embodiment shown in FIG. 3. The model reconstruction judger 51 judges whether or not to reconstruct a classification model and, if deciding to reconstruct a classification model, instructs the model constructor 13 to reconstruct a classification model. The model constructor 13 reconstruct a classification model and updates model-related information stored in the storage 18 and sensor control information stored in the storage 17. The model reconstruction judger 51 instructs the sensor controller 14 to transmit the updated sensor control information. The sensor controller 14 transmits the updated sensor control information stored in the storage 17 to the gateway apparatus 20.

The reason for reconstructing a classification model will be described. After a classification model is constructed first, sensor data and state data collected by the communicator 11 are accumulated in the storage 16. There may be a case where the sensor configuration is changed after construction of the classification model, for example, by newly installing a sensor for a monitoring target or removing an installed sensor. Further, there may be a case where, while the same sensor is used, the monitoring target of the sensor itself is changed to another monitoring target or may be expanded. In this case, if the same classification model is used, there is a possibility that the identification rate of anomaly detection decreases. Further, if a sensor corresponding to an explanatory variable included in the classification model is removed, necessary sensor data cannot be collected, and anomaly detection cannot be executed. Therefore, in such cases, it is necessary to reconstruct a classification model.

An example of judging by the model reconstruction judger 51 whether or not to reconstruct a classification model will be described below.

First Example of Classification Model Reconstruction Judgment

As a first example, the model reconstruction judger 51 monitors sensor data stored in the storage 16 in a predetermined cycle or at arbitrary timings (for example, at timings specified by the user). By comparing IDs of sensors (selected sensor IDs) used in a classification model constructed first or last (an existing classification model) with sensor IDs of sensor data collected afterwards, whether a change (addition, removal or the like) has been made in sensors or not. That is, it is judged whether or not, after sensor control to turn on sensors corresponding to explanatory variables used in the existing classification model and turn off the other sensors is started, a change is made in sensors by which sensor data is collected. For example, if "n+1" is detected as a sensor ID in sensor data collected this time, it is judged that a new sensor has been installed. Further, if a sensor ID of a sensor corresponding to a selected sensor ID is not detected, it is judged that an existing sensor has been removed.

If it is detected that a change has been made in the sensors, the model reconstruction judger 51 decides to reconstruct a classification model. The model reconstruction judger 51 instructs the model constructor 13 to reconstruct a classification model. However, in a case where an adequate amount of data is necessary to construct the classification model, construction of the model may not be performed until the necessary amount of data is collected so that a model construction instruction is given at a point of time when the necessary amount of data is accumulated.

The model constructor 13 constructs a classification model similarly to the first embodiment based on sensor data measured after the change was made in the sensors and state data (classification label data) indicating states of monitoring targets at the time of the measurement. Then, selected sensor IDs, representative data IDs and unselected sensor IDs are identified based on the classification model. The model constructor 13 adds new sensor control information (the selected sensor IDs, the representative data IDs and the unselected sensor IDs) to the storage 17. At this time, the last sensor control information may be deleted or may be left as it is. The model constructor 13 adds new model-related information (the classification model, the selected sensor IDs, the representative data IDs and the like) to the storage 18. The last model-related information may be deleted or may be left as it is.

The model reconstruction judger 51 instructs the sensor controller 14 to transmit the new sensor control information (the updated sensor control information). The sensor controller 14 reads out the updated sensor control information from the storage 17 and transmits the sensor control information to the gateway apparatus 20. The gateway apparatus 20 controls each sensor based on the updated sensor control information.

Second Example of Classification Model Reconstruction Judgment

The user inputs a model reconstruction instruction using the input/output apparatus 30, and the input interface 19 receives it. The input interface 19 notifies the instruction to the model reconstruction judger 51. The model reconstruction judger 51 decides to perform model reconstruction based on the instruction. Operation after that is the same as the first example. Reasons for the user to judge to perform model reconstruction are, for example, that the identification rate of anomaly detection has decreased, that a predetermined period has passed after a classification model was constructed first, that a sensor has been exchanged because of deterioration of the sensor, and the like. If a sensor ID is changed when a sensor is exchanged, a model reconstruction can be performed according to the first example described above.

Third Example of Classification Model Reconstruction Judgment

If a predetermined period has passed after the first or last classification model was constructed, the model reconstruction judger 51 decides to perform model reconstruction. Otherwise, if the identification rate of anomaly detection decreases while anomaly detection is performed using a classification model in the present apparatus, the model reconstruction judger 51 decides to perform model reconstruction. As examples of the case where the identification rate of anomaly detection decreases, a case where the identification rate of anomaly detection is below a threshold, a case where misdetection occurs a predetermined number of times or more, and the like are given. In these cases, the model reconstruction judger 51 decides to perform model reconstruction. Operation after that is the same as the first example.

Fourth Example of Classification Model Reconstruction Judgment

If the definition of classification label is changed, the model reconstruction judger 51 decides to perform model reconstruction. For example, the definition that the classification label shows any of the two states of normal and anomalous is changed to definition that the classification label shows any of three or more states. As an example of the three or more states, states "A", "B" and "C" are given. A change is made so that the classification label shows any of these states. As an example, the states "A", "B" and "C" are indicated by "01", "10" and "11". Three sections are generated using two thresholds, and classification labels can be assigned to the monitoring targets according to which sections state values of the monitoring targets belong.

In the case of handling three or more states, a multinomial logistic regression model or a multi-class SVM can be used as a classification model. Thereby, it is possible to judge which of the three or more states is applied.

Whether the definition of the classification label has been changed or not may be detected by analyzing classification label data. Otherwise, the user may input a model reconstruction instruction signal because of changing the definition of the classification label from the input/output apparatus 30 so that the model reconstruction judger 51 may decide to perform model reconstruction based on the signal. The model constructor 13 can use a function according to the number of states as a function for a classification model.

Figure 13:
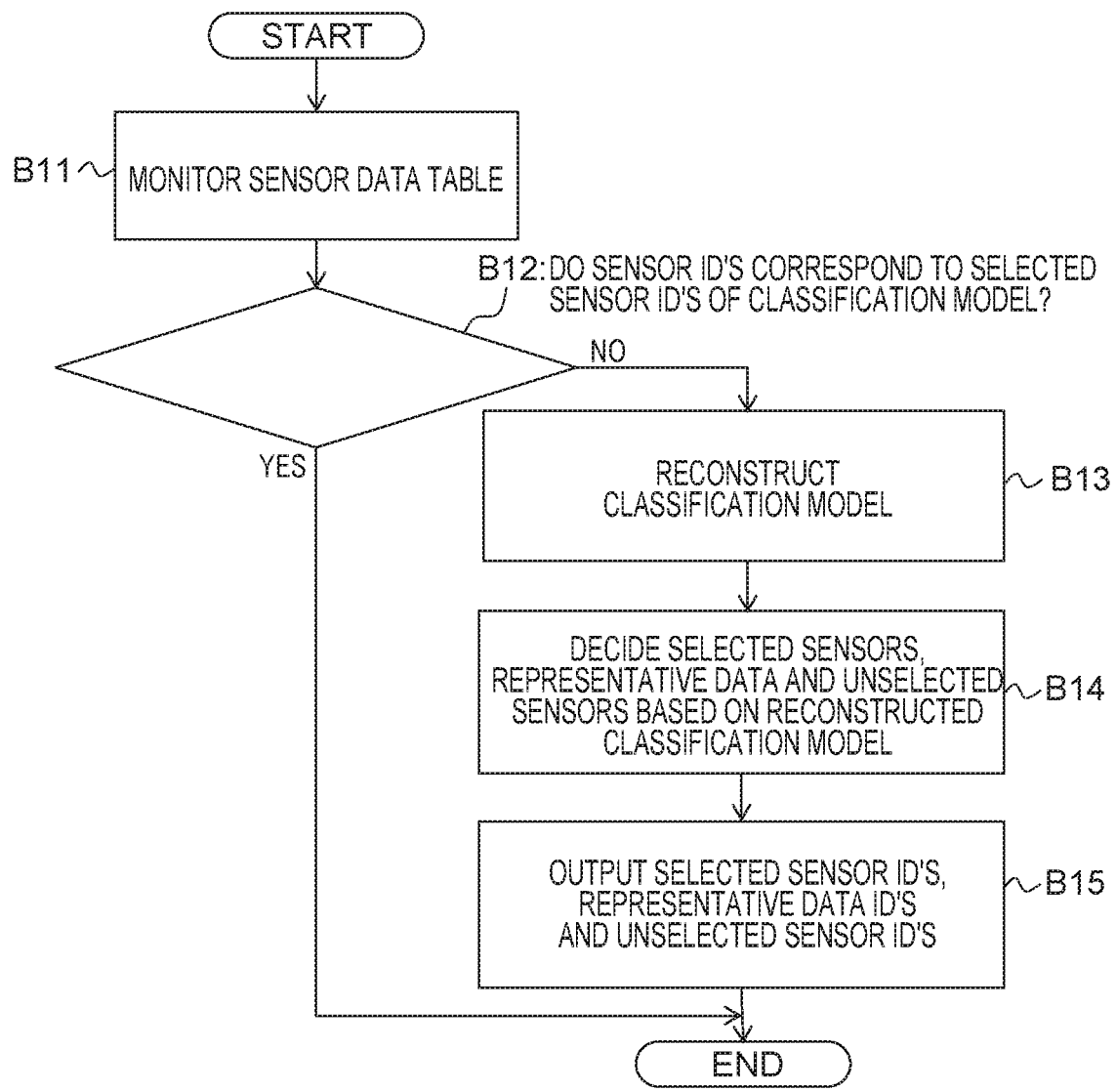
FIG. 13 is a flowchart of operation of the sensor control support apparatus according to the second embodiment.

FIG. 13 is a flowchart of operation of the sensor control support apparatus according to the present embodiment. Here, the operation according to the first example described above is shown.

After the first or last classification model (an existing classification model) is constructed, the model reconstruction judger 51 monitors sensor data stored in the storage 16 in a predetermined cycle or at arbitrary timings (B11).

It is judged whether IDs of sensors used in the existing classification model (selected sensor IDs) correspond to sensor IDs of sensor data collected afterward (B12). If a new sensor ID is found, or a selected sensor ID is not found in the collected sensor data, the model reconstruction judger 51 decides to reconstruct a classification model. In the former case, it is conceivable that a new sensor has been added, as an example. In the latter case, it is conceivable that an existing sensor has been removed, as an example.

The model constructor 13 reconstructs a classification model according to the decision to reconstruct a classification model by the model reconstruction judger 51 (B13). The model constructor 13 constructs the classification model similarly to the first embodiment based on sensor data after detection of the change in the sensors and classification label data. However, since an adequate amount of data is necessary to construct the classification model, construction of the model may not be performed until the necessary amount of data is collected so that the construction is performed at a point of time when the necessary amount of data is accumulated.

The model constructor 13 identifies selected sensor IDs, representative data IDs and unselected sensor IDs similarly to the first embodiment, based on the reconstructed classification model (B14). The model constructor 13 updates the sensor control information (the selected sensor IDs, representative data IDs and unselected sensor IDs) in the storage 17 and updates model-related information (the classification model, the selected sensor IDs, and the representative data IDs and the like) in the storage 18.

The sensor controller 14 notifies the updated sensor control information to the gateway apparatus 20 (B15). The gateway apparatus 20 controls each sensor based on the updated sensor control information.

As described above, according to the present embodiment, it becomes possible to reduce the trouble of manually making settings for operation of sensors and reduce power consumption and communication cost by, when sensors installed for monitoring are changed, identifying selected sensors required for state prediction again, causing the selected sensors which have been identified to be turned on and causing unselected sensors other than the selected sensors to be turned off.

Third Embodiment

Figure 14:
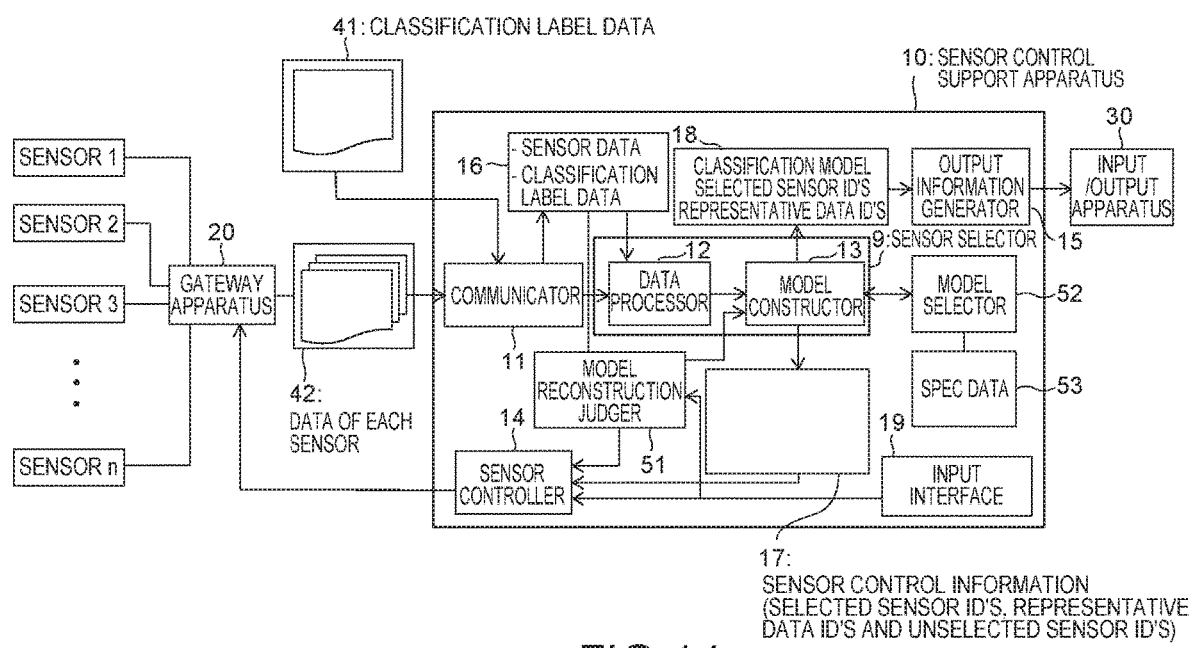
FIG. 14 is a block diagram showing a sensor control support apparatus according to a third embodiment.

FIG. 14 is a block diagram showing a sensor control support apparatus according to a third embodiment. A model selector 52 and a storage 53 holding spec data of sensors are added to the sensor control support apparatus according to the second embodiment shown in FIG. 12. The model selector 52 selects one of a classification model constructed first or last and a classification model reconstructed this time and notifies the model constructor 13 that the selected classification model is to be used. If it is decided that the first or last classification model is to be continuously used, the model constructor 13 does not update information in any of the storages 17 and 18. Further, the model reconstruction judger 51 does not instruct the sensor controller 14 to transmit sensor control information. On the other hand, if it is decided that the reconstructed classification model is to be used, operation similar to the case where a classification model is reconstructed in the second embodiment is performed.

An example of the model selector 52 performing model selection will be described below.

First Example of Model Selection

The model selector 52 compares the identification rate of a classification model constructed first or last (an existing classification model) with the identification rate of a classification model constructed this time (a latest classification model) and selects a classification model with a higher identification rate. The identification rate of each classification model can be calculated using sensor data and state data which are not used to construct each classification model.

Second Example of Model Selection

Based on costs of sensors corresponding to explanatory variables included in an existing classification model and costs of sensors corresponding to explanatory variables included in the latest classification model, the model selector 52 selects any one of the classification models. Cost of each sensor may be given in advance or may be calculated using spec data of the sensor.

FIG. 15 shows an example of a spec data table storing spec data of each sensor. This table includes the following items for each sensor:
Sampling frequency [Hz]
Sensor unit price [yen]
Continuous operating time [min]
DB capacity required for data storage [B]
Amount of power consumption of single sensor [kWh]

For sensors corresponding to the explanatory variables included in each classification model (that is, sensors of selected sensor IDs), the model selector 52 identifies corresponding spec data of the sensors from the spec data table and calculates costs of the sensors from the identified spec data. The following examples are conceivable as cost indexes.
Operation cost [yen]
Required DB capacity [B]
Amount of power consumption [kWh]

The operation cost includes cost of periodic inspection, replacement and the like as an example. Total cost obtained by summing up operation cost during a certain period (for example, five years) may be calculated. The necessary DB capacity is a storage capacity for storing sensor data acquired by a sensor. The amount of power consumption is that of a selected sensor.

The model selector 52 sums up costs of the selected sensors in each of the existing classification model and the latest classification model. By comparing the total costs, a classification model with a lower total cost is selected. As another method, a sensor with a highest cost may be identified for each of the classification models so that, if cost of the identified sensor exceeds an upper limit, a classification model using the sensor may not be selected. Model selection may be performed by a method other than the methods stated here as far as judgment utilizing costs is performed.

Third Example of Model Selection

Information about each classification model may be presented to the user via the input/output apparatus 30 so that a classification model selected by the user may be selected. At this time, the spec data tables of the sensors, costs of the sensors or the like may be presented to the user as reference information for model selection.

Both of the existing classification model and the latest classification model may be selected instead of selecting one of them. In this case, sensors used in at least one of both classification models can be selected sensors, and sensors which are used in neither of the classification models can be unselected sensors. Further, anomaly detection is performed by combining detection results of the two classification models. For example, if both classification models output the same detection result, the detection result is adopted. If the classification models output different detection results, a detection result with a smaller distance from the threshold "C" (see Formula 3 described before) may be adopted. Whether anomaly has been detected or not may be judged by a method other than the method stated here.

Fourth Embodiment

A hardware configuration of the sensor control support apparatuses according to the first to third embodiments will be described.

Figure 16:
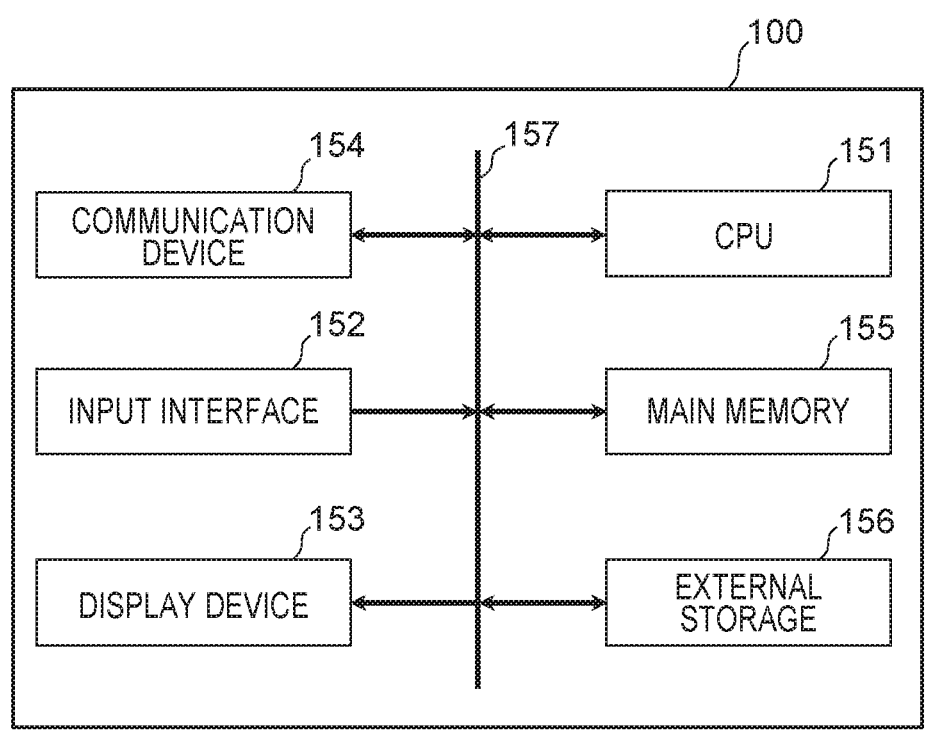
FIG. 16 is a diagram showing a hardware configuration of a sensor control support apparatus according to a fourth embodiment.

FIG. 16 shows a hardware configuration of sensor control support apparatuses according to the present embodiments. Each of the sensor control support apparatuses according to the present embodiments is configured with a computer apparatus 100. The computer apparatus 100 is provided with a CPU 151, an input interface 152, a display device 153, a communication device 154, a main memory 155 and an external storage 156, which are mutually connected via a bus 157.

The CPU (Central Processing Unit) 151 executes sensor control support, which is a computer program, on the main memory 155. The sensor control support refers to a program which realizes each of the above-described functional components of the sensor control support apparatus. By the CPU 151 executing the sensor control support, each functional component is realized.

The input interface 152 is a circuit for inputting an operation signal from an input device such as a keyboard, a mouse and a touch panel to the sensor control support apparatus.

The display device 153 displays data or information outputted from the sensor control support apparatus. The display device 153 is, for example, an LCD (Liquid Crystal Display), a CRT (Cathode-Ray Tube) or a PDP (Plasma Display) but is not limited thereto. The data or information outputted from the computer apparatus 100 can be displayed by the display device 153.

The communication device 154 is a circuit for the sensor control support apparatus to wirelessly or wiredly communicate with an external apparatus. Measurement data can be inputted from the external apparatus via the communication device 154. The measurement data inputted from the external apparatus can be stored into a sensor database.

The main memory 155 stores the sensor control support, data required for execution of the sensor control support, data generated by execution of the sensor control support and the like. The sensor control support is developed on the main memory 155 and executed. The main memory 155 is, for example, a RAM, a DRAM or an SRAM but is not limited thereto. The storage 16, 17, 18 or 53 in each embodiment may be constructed on the main memory 155.

The external storage 156 stores the sensor control support, data required for execution of the sensor control support, data generated by execution of the sensor control support and the like. The program and data are read out onto the main memory 155 at the time of executing the sensor control support. The external storage 156 is, for example, a hard disk, an optical disk, a flash memory or a magnetic tape but is not limited thereto. The storage 16, 17, 18 or 53 in each embodiment may be constructed on the external storage 156.

The sensor control support may be installed in the computer apparatus 100 in advance or may be stored in a recording medium such as a CD-ROM. Further, the sensor control support may be uploaded onto the Internet.

The computer apparatus 100 may be provided with one or more processors 151, input interfaces 152, display devices 153, communication devices 154 and main memories 155, and peripheral equipment such as a printer and a scanner may be connected to the computer apparatus 100.

Further, the sensor control support apparatus may be configured with a single computer apparatus 100 or may be configured as a system constituted by a plurality of computer apparatuses 100 that are mutually connected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
a communicator configured to collect measurement data;
a sensor selector configured to, based on the measurement data of a plurality of sensors for at least one monitoring target and state data indicating an state of the at least one monitoring target, select a sensor to be used for state prediction of the monitoring target from among the plurality of sensors; and
a sensor controller configured to control the plurality of sensors based on a selection result of the sensor selector;
wherein:
the sensor selector constructs a classification model in which at least one explanatory variable corresponding to at least one sensor among the plurality of sensors is associated with an objective variable indicating a predicted state of the monitoring target, based on the measurement data and the state data;
the sensor selector causes the sensor corresponding to the at least explanatory variable to be the sensor to be used for the state prediction;
when a sensor different from the plurality of sensors is detected or the selected sensor is not detected in the collected measurement data, the sensor selector reconstructs the classification model; and
the sensor selector causes a sensor corresponding to an explanatory variable included in the reconstructed classification model to be the sensor to be used for the state prediction.

2. The apparatus according to claim 1, wherein
the sensor selector calculates an identification rate of the classification model and an identification rate of the reconstructed classification model and selects one of the classification model and the reconstructed classification model based on calculated identification rates; and
the sensor selector causes a sensor corresponding to the explanatory variable included in the selected classification model to be the sensor to be used for the state prediction.

3. The apparatus according to claim 1, wherein
the sensor selector selects one of the classification model and the reconstructed classification model based on cost of a sensor corresponding to the explanatory variable included in the classification model and cost of the sensor corresponding to the explanatory variable included in the reconstructed classification model; and
the sensor selector causes a sensor corresponding to the explanatory variable included in the selected classification model to be the sensor to be used for the state prediction.

4. The apparatus according to claim 1, comprising an input interface configured to receive a user instruction;
wherein:
the sensor selector selects one of the classification model and the reconstructed classification model based on the user instruction received by the input interface; and the sensor selector causes a sensor corresponding to the explanatory variable included in the selected classification model to be the sensor to be used for the state prediction.

5. An information processing method comprising:

selecting, based on measurement data of a plurality of sensors for at least one monitoring target and state data indicating an state of the at least one monitoring target, a sensor to be used for state prediction of the monitoring target from among the plurality of sensors;

controlling the plurality of sensors based on a selection result of the sensor selector;

constructing a classification model in which at least one explanatory variable corresponding to at least one sensor among the plurality of sensors is associated with an objective variable indicating a predicted state of the monitoring target, based on the measurement data and the state data;

causing the sensor corresponding to the at least explanatory variable to be the sensor to be used for the state prediction;

collecting the measurement data;

reconstructing the classification model when a sensor different from the plurality of sensors is detected or the selected sensor is not detected in the collected measurement data; and causing a sensor corresponding to an explanatory variable included in the reconstructed classification model to be the sensor to be used for the state prediction.

6. A non-transitory computer readable medium having a computer program stored therein which causes a computer to perform processes comprising:

selecting, based on measurement data of a plurality of sensors for at least one monitoring target and state data indicating an state of the at least one monitoring target, a sensor to be used for state prediction of the monitoring target from among the plurality of sensors;

controlling the plurality of sensors based on a selection result of the sensor selector;

constructing a classification model in which at least one explanatory variable corresponding to at least one sensor among the plurality of sensors is associated with an objective variable indicating a predicted state of the monitoring target, based on the measurement data and the state data;

causing the sensor corresponding to the at least explanatory variable to be the sensor to be used for the state prediction;

collecting the measurement data;

reconstructing the classification model when a sensor different from the plurality of sensors is detected or the selected sensor is not detected in the collected measurement data; and causing a sensor corresponding to an explanatory variable included in the reconstructed classification model to be the sensor to be used for the state prediction.

* * * * *

UNITED STATES PATENT AND TRADEMARK OFFICE
CERTIFICATE OF CORRECTION

PATENT NO. : 11,092,460 B2  
APPLICATION NO. : 15/906341  
DATED : August 17, 2021  
INVENTOR(S) : Myungsook Ko et al.

Page 1 of 1

It is certified that error appears in the above-identified patent and that said Letters Patent is hereby corrected as shown below:

On the Title Page

Item (57), Line 4 of ABSTRACT, "indicating an state" should read --indicating a state--.

In the Claims

Claim 1, Column 20, Line 15, "indicating an state" should read --indicating a state--.

Claim 5, Column 21, Line 8, "indicating an state" should read --indicating a state--.

Claim 6, Column 22, Line 6, "indicating an state" should read --indicating a state--.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*